Oct. 5, 1943.  E. R. BERGMANN  2,330,946
SHAKER CONVEYER
Filed July 23, 1941  2 Sheets-Sheet 1
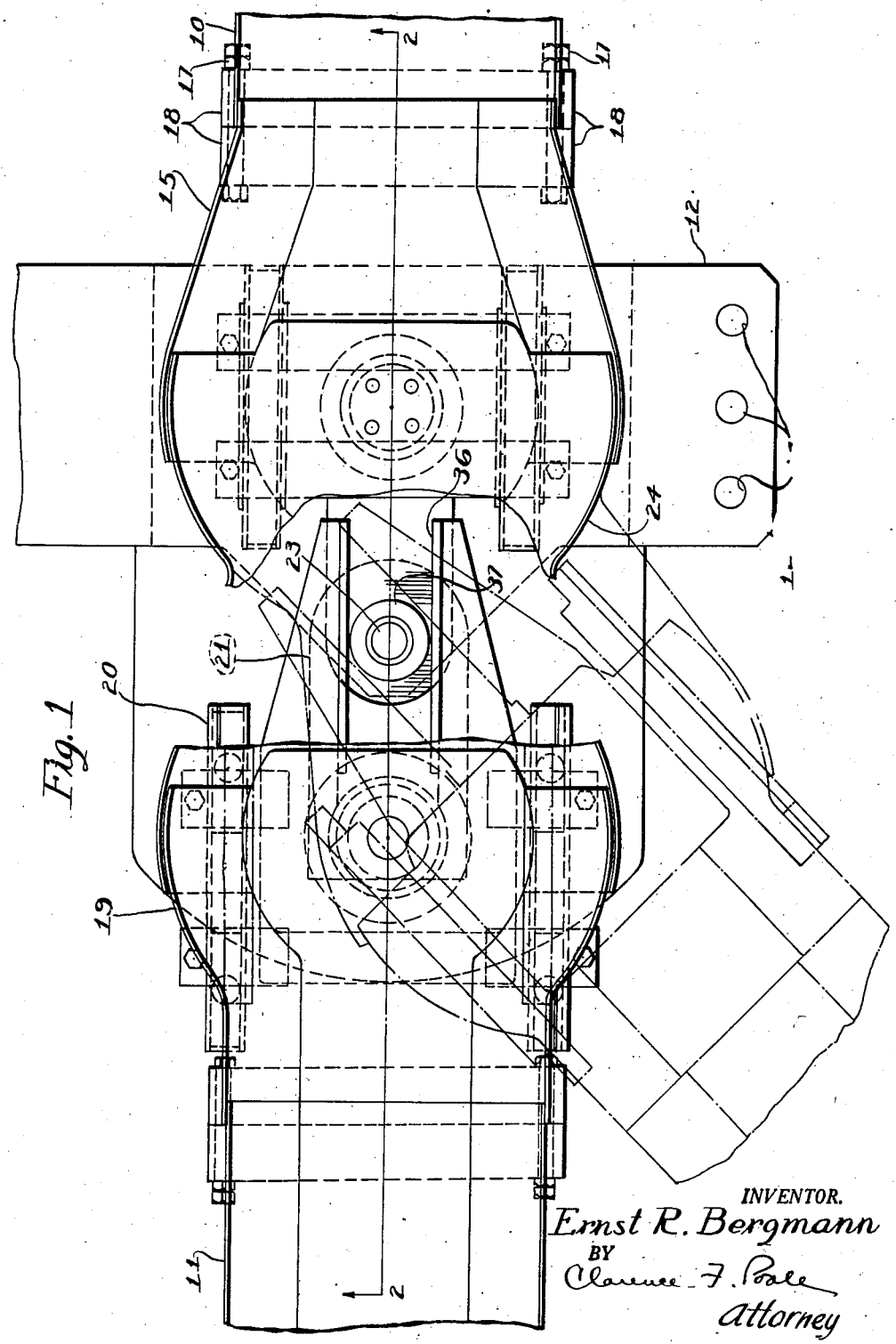
INVENTOR.
Ernst R. Bergmann
BY
Clarence F. Poole
Attorney Oct. 5, 1943.  E. R. BERGMANN  2,330,946
SHAKER CONVEYER
Filed July 23, 1941  2 Sheets-Sheet 2
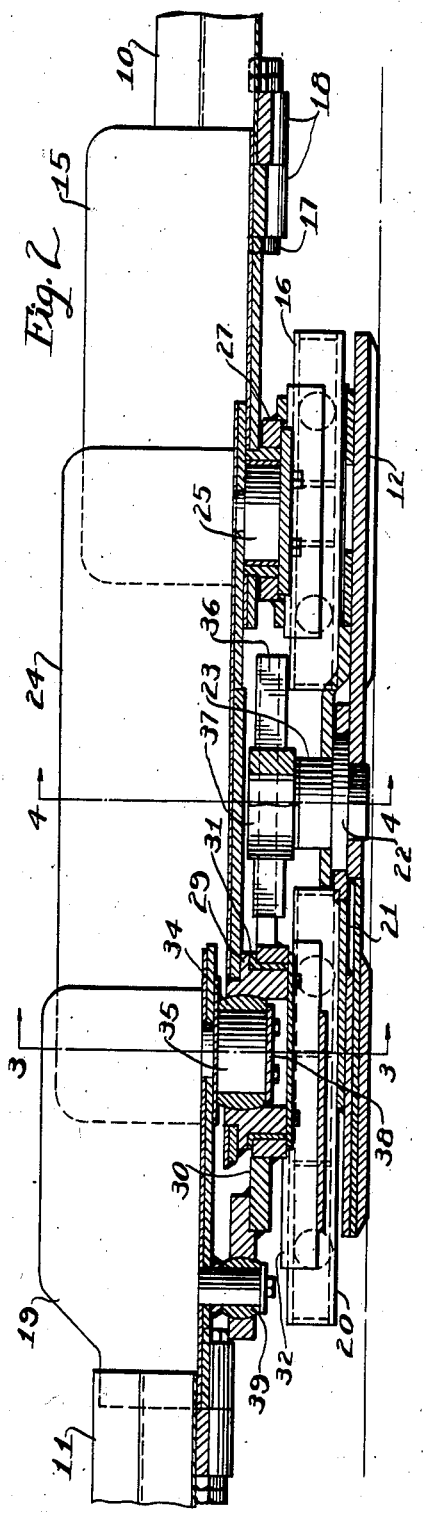
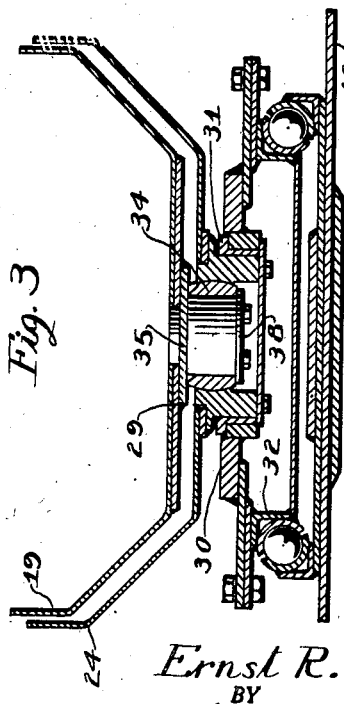
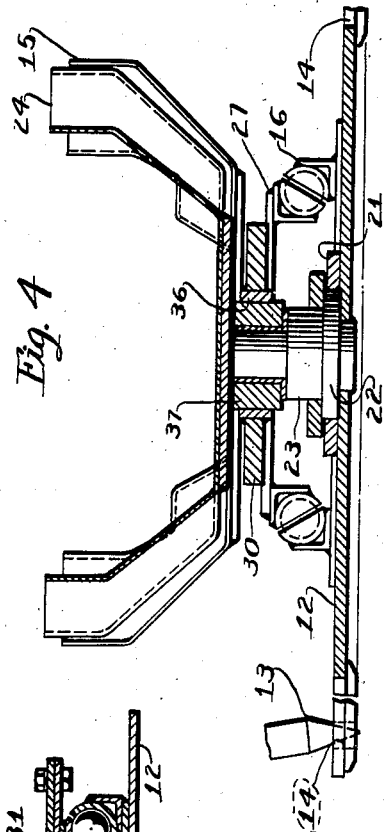
INVENTOR.
Ernst R. Bergmann
BY
Clarence F. Poole
Attorney Patented Oct. 5, 1943

2,330,946

UNITED STATES PATENT OFFICE 2,330,946

SHAKER CONVEYER

Ernst R. Bergmann, Chicago, Ill., assignor to Goodman Manufacturing Company, Chicago, Ill., a corporation of Illinois Application July 23, 1941, Serial No. 403,756

8 Claims. (Cl. 198—220)

This invention relates to improvements in shaker conveyers and has among other objects to provide a novel form of swivel connection in a shaker conveyer trough line, so arranged as to permit a maximum amount of lateral adjustable movement of one trough section of the conveyor with respect to another and to take the side thrusts away from the supporting means for the trough sections of the conveyer, when said trough sections are positioned laterally with respect to each other.

A more specific object of my invention is to provide an articulated connection between the driving and driven trough sections of a conveyer, including a base held stationary on the ground and a guiding connection between the driven trough section and this base, arranged to transmit the side thrusts from the driven trough section to the base and to relieve the trough sections and their supporting means from side thrusting forces when the driven trough section is in various lateral positions with respect to the driving trough section.

Other objects of my invention will appear from time to time as the following specification proceeds and with reference to the accompanying drawings wherein:

Figure 1 is a plan view of a swivel constructed in accordance with my invention, with certain parts broken away in order to more clearly illustrate certain details of my invention;

Figure 2 is an enlarged longitudinal sectional view taken substantially along line 2—2 of Figure 1;

Figure 3 is a transverse sectional view taken substantially along line 3—3 of Figure 2; and Figure 4 is a transverse sectional view taken substantially along line 4—4 of Figure 2.

In the drawings, the embodiment of my invention illustrated is shown as providing an articulated connection between a driving trough section 10 of a shaker conveyer trough line and a forwardly spaced driven trough section 11, to permit lateral swinging movement of one trough section with respect to the other so the conveyer may carry material around corners, or so a pick-up member on the forward end of the driven trough section may pick up material from the extreme corners of a wide room or may be extended along a cross cut or entry at an angle to the main part of the conveyer, to pick up material therefrom.

The articulated connection between the driving and driven trough sections of the conveyer includes a base 12 adapted to be firmly held in position on the ground by means of a plurality of jacks 13, 13 engageable with sockets 14, 14 in said base at their lower ends and with the mine roof at their upper ends.

A connecting trough section 15 is reciprocably mounted on said base on a usual form of ball frame, indicated by reference character 16. Said connecting trough section is adapted to have connection with the forward end of the trough section 10 by means of the usual connecting bolts 17, 17 extending through abutting eyes 18, 18.

A forward connecting trough section 19 is mounted on said base and is connected at its receiving end with the discharge end of the trough section 11. Said forward connecting trough section is mounted on a ball frame 20, for reciprocable and for lateral swinging movement with respect to said base and for limited pivotal movement about an axis extending longitudinally of the trough section 11, to permit said trough section to follow a transversely pitching seam without twisting or binding of the parts of the swivel, as will hereinafter more clearly appear as this specification proceeds. Said ball frame is mounted on the forward end of an arm 21, which is laterally slidable along said base and is pivotally connected with a flanged portion 22 of a vertical stud 23, mounted on and extending upwardly from said base.

An intermediate trough section 24 is pivotally connected at its ends to adjacent ends of the connecting trough sections 15 and 19 and bridges the gap between said trough sections. It should here be noted that one purpose in spacing the trough sections 15 and 19 from each other and bridging the gap between these trough sections by an intermediate trough section is to split the angle between said trough sections, and eliminate abrupt turns from one trough section to another, to prevent the piling up of material at the turn.

The intermediate trough section 24 has a stub shaft 25 secured to and depending from its bottom and journaled in an upper frame member 27, of the ball frame 16 (see Figure 2). The opposite end of said intermediate trough section underlaps the forward connecting trough section 19 and has a bearing member 29 secured thereto and depending therefrom, which is journaled in a control arm 30, on a bearing 31. Said control arm is in turn mounted on an upper frame 32 for the ball frame 20 (see Figures 2 and 3).

The bearing member 29 is hollow and its inner periphery has a concave bearing surface which is adapted to be engaged by a convexly formed bearing member 34, mounted on a stub shaft 35, which is secured to and depends from the bottom of the rear end of the forward connecting trough section 19. A retaining plate 38 is secured to the lower end of said shaft, to hold said bearing member on said shaft. Thus a ball and socket mounting is provided between the intermediate trough section 24 and the forward connecting trough section 19, permitting said trough section and the trough section 11 to pivot about a longitudinal axis and to follow a laterally pitching seam without causing twisting of said trough section or binding of the parts of the swivel.

The control arm 30 extends from the stub shaft 35 in a direction towards the center of the base 12 and has a rearward bifurcated guide portion 36, which slidably engages a guide roller 37 mounted on the upper end of the stud 23 and forms a rectilinear guide for said connecting and driven trough sections. The opposite end of said control arm extends in advance of the stub shaft 35 and has connection with the connecting trough section 19, adjacent its forward end, by means of a ball and socket connection, indicated generally by reference character 39.

It may be seen from the foregoing that when the forward driven trough section 11 is swung laterally with respect to the base 12, pivotal movement thereof will be controlled by the control arm 30, which will cause said trough section to pivot about the axis of the roller 37. At the same time the ball frame 20 will be swung by said control arm about said axis. Thus, upon reciprocation of the conveyer, the guide portion 36 will reciprocably move along the roller 37 and will be guided by said roller for longitudinal slidable movement with respect to the base 12, and any side thrusting motion transmitted to the trough section 11 by the trough section 10, or vice versa, caused by the fact that the trough section 11 is at an angle to the longitudinal center line of said trough section 10 and is driven by said first mentioned trough section, will be transmitted by the roller 37 to the base 12, rigidly held in position on the ground. This will also relieve the ball frames 16 and 20 from these side thrusting loads.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a swivel for a shaker conveyer trough line, including a driving and a driven trough section, one of said trough sections being laterally swingable with respect to the other, a base, anti-friction support means for mounting said driving and driven trough sections for reciprocable movement with respect to said base, one of said support means being movable across said base about a fixed pivotal axis, an intermediate trough section pivotally connecting said trough sections together, a slidable guiding connection between said base and said laterally swingable trough section, for guiding said trough section for movement about a fixed point remote from its end adjacent said intermediate trough section, and in a fixed rectilinear path in all positions of lateral adjustment of said trough section with respect to said base, for transmitting lateral thrusting loads to said base and for relieving said support means from said lateral thrusting loads.

2. In a swivel for a shaker conveyer trough line including a driving and a driven trough section, one of said trough sections being laterally swingable with respect to the other, a base, anti-friction support means for mounting said driving and driven trough sections for reciprocable movement with respect to said base, one of said support means being movable across said base about a fixed pivotal axis, an intermediate trough section pivotally connecting said trough sections together, a slidable guiding connection between said base and said laterally swingable trough section, for guiding said trough section for movement about a fixed point remote from its end adjacent said intermediate trough section and for guiding said swingable trough section for movement in a fixed rectilinear path in all positions of lateral adjustment with respect to said base and adapted to transmit lateral thrusting loads to said base and to relieve said support means from said lateral thrusting loads including a guide member on said base and a control arm mounted on said anti-friction means and engaging said guide member, said control arm having connection with said laterally swingable trough section at a point remote from the axis of connection of said intermediate trough section to said laterally swingable trough section.

3. In a swivel for a shaker conveyer trough line including a driving and a driven trough section, one of said trough sections being laterally swingable with respect to the other, a base, anti-friction support means for mounting said driving and driven trough sections for reciprocable movement with respect to said base, one of said support means being movable across said base about a fixed pivotal axis, an intermediate trough section pivotally connecting said trough sections together, a slidable guiding connection between said base and said laterally swingable trough section, for guiding said trough section for movement about a fixed point remote from its end adjacent said intermediate trough section and for guiding said swingable trough section for movement in a fixed path in all positions of lateral adjustment with respect to said base and adapted to transmit lateral thrusting loads to said base and to relieve said support means from said lateral thrusting loads, including an anti-friction guide member mounted on said base for rotation about an axis coaxial with the axis of pivotal connection of said transversely movable anti-friction support member to said base, and a control arm mounted on said anti-friction support means and having slidable engagement with said anti-friction guide member and having connection with said laterally swingable trough section at a point remote from the axis of pivotal connection of said intermediate trough section to said laterally swingable trough section.

4. In a swivel for a shaker conveyer trough line including a driving trough section and a driven trough section having a receiving end spaced from said driving trough section, an intermediate trough section pivotally connecting adjacent ends of said trough sections together, a base, anti-friction support means for mounting said driving and driven trough sections for reciprocable movement with respect to said base, and a connection between said driven trough section and said base, permitting movement of said trough section across said base about a fixed vertical axis including an arm pivotally mounted on said base at a point spaced from the discharge end of said driven trough section, said arm forming a support for said anti-friction support means for supporting said transversely movable trough section, a guiding connection between said driven trough section and said base, for transmitting lateral thrusting forces to said base including a guide member on said base, a control arm having connection with said laterally movable trough section and having slidable engagement with said guide member, and a ball and socket connection between said driven trough section and its associated anti-friction support means, permitting said driven trough section to tilt about a longitudinal axis and to follow a laterally pitching seam during transverse movement of said trough section with respect to said base.

5. In an articulated trough connection for a shaker conveyer trough line, a base adapted to be secured to the ground, a driving trough section reciprocally mounted at its receiving end on said base, a driven trough section, an intermediate trough section pivotally connecting said driving and driven trough sections together, and a mounting on said base for the discharge end of said driven trough section, said mounting being movable laterally across said base and supporting said driven trough section for movement laterally across said base about a fixed vertical axis and holding said driven trough section for reciprocable movement in a fixed rectilinear path in its various positions of adjustment with respect to said base, a guide member mounted on said base, and a control arm rigidly connected with and projecting from said driven trough section and having slidable engagement with said guide member.

6. In an articulated trough connection for a shaker conveyer trough line, a base adapted to be held stationary on the ground, a driving trough section, anti-friction means for supporting the receiving end of said driving trough section on said base, a laterally adjustable driven trough section having a discharge end spaced from the receiving end of said driving trough section, anti-friction means for supporting the discharge end of said driven trough section on said base, an intermediate trough section pivotally connected between adjacent ends of said trough sections, and a reciprocating control arm rigidly connected to said driven trough section and projecting towards said driving trough section and having slidable engagement with said guide member, for holding said driven trough section for pivotal movement about said guide member in a fixed path, and for guiding said driven trough section for reciprocable movement in a fixed rectilinear path.

7. In an articulated trough connection for a shaker conveyer trough line, a driving trough section, a driven trough section, one of said trough sections being laterally swingable with respect to the other, a base, anti-friction support means on said base for mounting said driving and driven trough sections for reciprocable movement with respect to said base, means connecting one of said support means to said base for movement transversely across said base about a vertical axis, and a slidable guiding connection between said base and said laterally swingable trough section, for guiding said laterally swingable trough section for pivotal movement about the axis of movement of said laterally swingable support means and for reciprocable movement in a fixed rectilinear path in its various positions of lateral adjustment with respect to said base.

8. In an articulated trough connection for a shaker conveyer trough line, a driving trough section, a driven trough section, one of said trough sections being laterally swingable with respect to the other, a base, anti-friction support means on said base for mounting said driving and driven trough sections for reciprocable movement with respect to said base, means connecting one of said support means to said base for movement transversely across said base about a vertical axis, and a slidable guiding connection between said base and said laterally swingable trough section, for guiding said laterally swingable trough section for pivotal movement about the axis of movement of said laterally swingable support means and for reciprocable movement in a fixed rectilinear path in its various positions of lateral adjustment with respect to said base including a guide member mounted on said base and a control arm extending from said laterally swingable trough section and having slidable engagement with said guide member.

ERNST R. BERGMANN.